A. J. BORST, Jr.
VEHICLE.
APPLICATION FILED MAY 28, 1918.
1,374,352.
Patented Apr. 12, 1921.
2 SHEETS—SHEET 2.
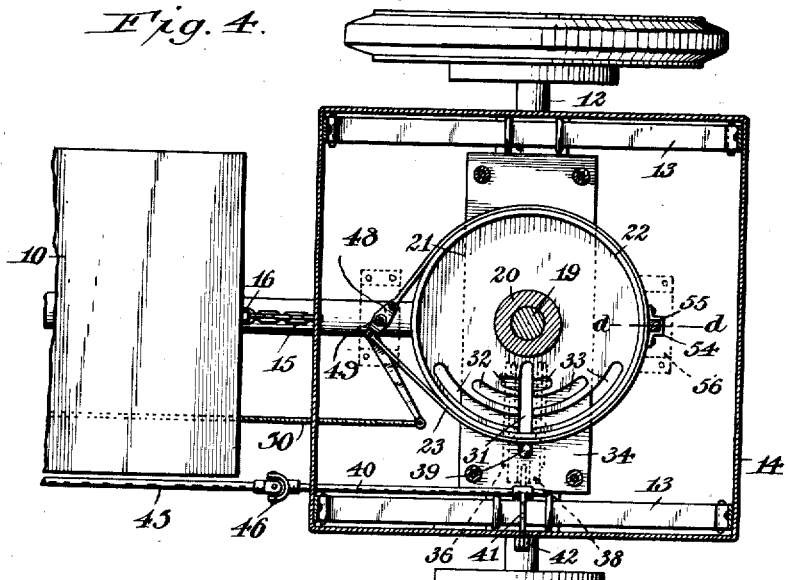
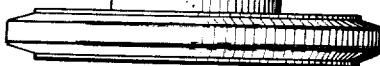
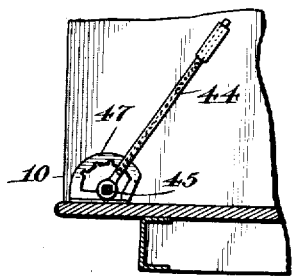
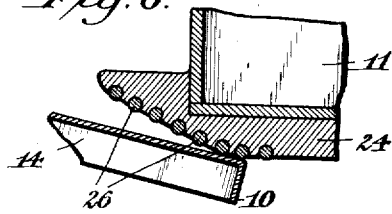
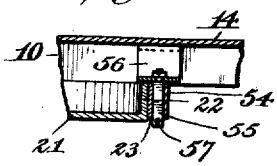
Andrew J. Borst, Jr., Inventor.

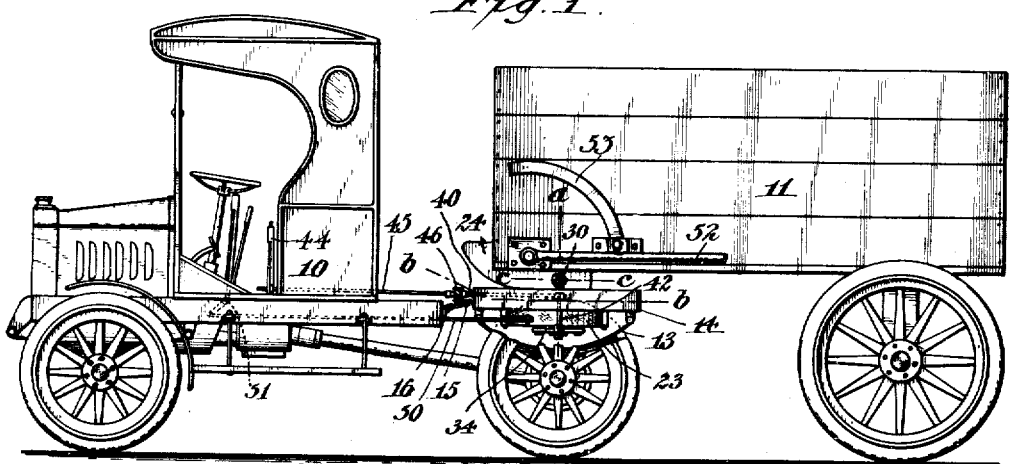

UNITED STATES PATENT OFFICE.

ANDREW J. BORST, JR., OF BUFFALO, NEW YORK.

VEHICLE.

1,374,352.  Specification of Letters Patent.  Patented Apr. 12, 1921.

Application filed May 28, 1918. Serial No. 236,986.

*To all whom it may concern:*

Be it known that I, ANDREW J. BORST, Jr., a citizen of the United States, residing at Buffalo, in the county of Erie and State of New York, have invented certain new and useful Improvements in Vehicles, of which the following is a specification.

My invention relates to improvements in vehicles, and more particularly to that type of vehicle including a tractor and trailer or semi-trailer.

Considerable difficulty has been experienced in the operation of trailers or semi-trailers attached to tractors, due to the fact that it has been extremely difficult to control the movement of the trailer when backing up. As trailers are invariably used for carrying heavy loads to and from freight houses, warehouses, factories, etc., arranged for loading or unloading wares and material through and from the rear ends of vehicles, it has been found necessary in many cases to back trailers into very close spaces, and in some instances into narrow driveways, which would permit only slight deviation from a straight course, but this it has been found difficult to do without damaging property or the trailer itself.

In the common form of coupler used for coupling a trailer to a tractor, whether equipped with a fifth wheel or otherwise designed, any slight deviation of the tractor from a straight course would swing the rear end of the trailer in a direction opposite that in which the tractor happened to be positioned, with the result that the operator of the tractor would not be able to control the movement of the trailer or moved vehicle.

One of the primary objects of my invention is to provide a trailer coupling by means of which the trailer may be held in direct alinement or at any angle, within certain limits, to the tractor.

Another object of my invention is the provision of a coupling having a part thereof secured to the tractor and a part thereof attached to the trailer, the coöperating members of said coupling being easily and conveniently connected and disconnected.

Another object is to so construct the coupling that the tractor may be moved backward underneath the trailer and the two parts of the coupling connected in a manner to permit the trailer to travel at an angle to the tractor.

Another object of my invention is to provide a coupling having selective means for limiting the angularity of the trailer with reference to the tractor.

A further object is to provide a connection between the trailer and tractor having brake-mechanism whereby the trailer may be held in alinement with the tractor, or at any angle thereto.

Still further objects are to provide a coupling of this kind, which is simple, which consists of few parts, and which can be easily manipulated.

With these and other objects in view to be hereinafter set forth, the invention consists in a coupling having means for holding the trailer in the desired position with reference to the tractor; in selective means for limiting the angular movement of the trailer with reference to the tractor, and in the novel features of construction, arrangement and combination of parts to be hereinafter described and more paritcularly pointed out in the subjoined claims.

In the drawings:—

Figure 1 is a side elevation of my improved vehicle illustrated as comprising a tractor and semi-trailer coupled together, part of the tractor being broken away to more fully disclose certain features of my invention.

Fig. 2 is a view of the rear end of a tractor and a semi-trailer disconnected, the front end of said semi-trailer being held elevated by a suitable support to enable the rear end of the tractor to be moved underneath the front end of said semi-trailer.

Fig. 3 is an enlarged cross section taken on line $a$, Fig. 1.

Fig. 4 is an enlarged horizontal section taken on line $b$—$b$, Fig. 1.

Fig. 5 is an enlarged horizontal section taken on line $c$—$c$, Fig. 1.

Fig. 6 is a vertical longitudinal section through the front end of the trailer coupling member and the rear portion of the tilting platform of the tractor.

Fig. 7 is a sectional detail view showing the controlling lever for manipulating the selective means whereby the trailer may be held at the desired angle with reference to the tractor.

Fig. 8 is a vertical section taken on line $d$—$d$, Fig. 4.

Reference being had to the drawings in detail, like numerals refer to like parts in the several figures.

The reference numeral 10 designates the tractor and 11 the trailer, shown in the drawings in the form of what is generally termed a "semi-trailer," due to the fact that no wheels are provided at the front end of the trailer body.

While this invention is illustrated in connection with a semi-trailer, it is to be understood that it may be as readily used in connection with a trailer having a wheel or wheels at its front end in addition to those shown at the rear.

The tractor is provided with the usual rear axle 12 on which springs 13 are supported, these springs being so connected to the axle that they may tilt thereon. Secured to the ends of these springs 13 is a platform 14 which is yieldingly supported by said springs and by reason of said springs being arranged to tilt may be termed a yielding tilting platform. The front end of this platform has one end of a chain 15 secured thereto, the other end being secured to a rigid portion of the tractor body, as at 16. This chain serves to arrest the rearward tilting movement of the platform after it reaches a certain inclination.

It is to be understood that certain advantages of my invention may be secured even though the platform be rigid; or, the rigid body portion may be extended and the rear end thereof serve as a platform.

It is also to be understood that the platform may be tilted by supporting the same in any one of various other ways than herein shown, and I do not wish to limit myself to a tilting platform nor to the manner of supporting or tilting the same.

Where in the claims reference is made to a platform without describing the characteristics thereof, it is intended to mean any portion of the tractor capable of supporting the front end of the trailer.

17 designates a bearing secured to the platform 14, this bearing being constructed to open upwardly through the top of the platform. Arranged on the platform is the rotatable coupling member 18 of my improved coupling. This coupling member is elongated and the front portion thereof is parallel sided while the rear portion is tapered and the extremity of said tapered portion rounded. It also has a depending stud 19 rotatable in the bearing 17. To the lower end of said stud the hub 20 of a brake-drum 21 is secured, said brake-drum having a peripheral flange 22 around which a brake-band 23 is arranged.

At the front end of the trailer a rigid coupling member 24 is arranged. This coupling member is in the form of a channeled casting closed at its rear end, as at 25, and having an upwardly curved or rounded front portion extending forward from the body of the trailer, forming a skid-like member. As clearly shown in Fig. 6, the spaced portions of this casting have anti-friction rollers 26 along the lower edges at their front ends, for a purpose to appear hereinafter.

The rotatable coupling member 18 has a transverse bolt hole 27, and the spaced portions of said rigid coupling member have alined holes 28. When the rotatable coupling member is properly entered between the spaced portions of the rigid coupling member, the bolt holes of these members are in alinement and a bolt 29 is passed therethrough to secure the two together and consequently the trailer to the tractor, a nut 30 being threaded onto the end of said bolt.

The web or disk portion of the brake-drum 21 has a radial slot 31 formed therein which opens at the periphery of said drum, and two series of segmental slots 32, 33, respectively, extending forwardly and rearwardly from said radial slot, the slots of each series being diminished in length inwardly toward the axis of the brake-drum.

Secured to the platform 14 in any suitable manner is a support 34 in the form of a transverse bar having a slot 35 registering with the radial slot 31 in the brake-drum, and at opposite sides of the slot 35, guide-bars 36 are arranged which provide grooves 37 in which a slide member 38 is adapted to slide, said member having an upstanding stud 39 normally spaced from the exterior of the brake-drum and adapted to be moved into the radial slot 31 of said drum in line with any two segmental slots of the two series formed in the brake-drum, or said stud may be positioned against the inner end of said radial slot.

Extending forwardly underneath the top of the platform 14 is a rock-shaft 40 to which an arm 41 is secured, the outer end of which has pivotal connection with a link 42 which is pivotally connected to a lug 43 formed on said sliding member. For conveniently manipulating said rock shaft, a lever 44 is provided within convenient reach of the operator of the tractor, said lever being connected to a rock shaft 45 extending lengthwise above the floor of the rigid portion of the tractor and being coupled to the rock-shaft 40 by a universal joint 46. The lever 44 may be moved into any one of a series of positions along a notched segment 47, into the notches of which a spring-controlled dog is adapted to engage, as is common. The extent of this movement will govern the amount of rotation of the rock shaft 40 and consequently the extent of movement of the stud 39 operatively connected with said rock shaft. In this manner the stud can be moved entirely clear of the brake-drum, into the radial slot thereof in alinement with any one of the segmental slots of the two series formed in said drum, or against the inner end of said radial slot.

When in the position shown in Fig. 3, the trailer is free to swivel and assume any angle with reference to the tractor. When said stud is moved in line with the two longest segmental slots of the two series in the brake-drum, the stud 39 will move into one or the other of said segmental slots, depending on the direction of angularity of the trailer, and when the stud strikes the end of the segmental slot in which it has been entered, it will limit further angular movement of the trailer with reference to the tractor. When the stud is moved in line with either of the intermediate segmental slots of the two series, the same action takes place, except that the limit of angularity will be reached sooner, due to the stud striking the end of the slot at a lesser angle. This angular movement is further limited by the inner or shortest segmental slots of the series, and when the stud is placed against the inner end of the radial slot 31 the trailer is held in direct alinement with the tractor. The stud 39, the parts for moving the same and the radial and segmental slots in the brake-drum constitute the selective means for limiting the angular movement of the trailer with reference to the tractor.

The brake-band 23 is positioned around the brake-drum and has opposite ends secured to a lever 48 at opposite sides of its pivotal point 49. One end of said lever has one end of a cable 50 secured thereto, the other end of which is secured to an operating lever pivoted between its ends, as at 51. It is therefore apparent that the brake-band may be tightened at any time regardless of the position of the trailer with reference to the tractor, and that by tightening the brake-band around the brake-drum the trailer will be held in any position that it may be in. In order to keep the brake-band in proper position around the drum when loose, a clip 54 is secured thereto, through which a rod 55 is passed; said rod having its upper end secured in a bracket 56 secured to the under side of the platform and having a cotter pin 57 passed therethrough directly beneath and in contact with the lower end of said clip. To allow a change in position requires merely the loosening of the brake-band, whereupon the trailer is permitted to adjust itself to the direction of the force applied thereto, after which the brake-band may again be tightened to hold the trailer in the desired position until a change of position is again advisable.

It will be apparent from the foregoing that the brake-band may be used independent of the selective means for limiting the angular movement of the trailer with reference to the tractor, or that said selective means may be used independent of the brake-band, but a decided advantage is obtained by coöperation of these two features of my invention since by means of the segmental slots 32, 33, the desired angularity for rounding certain corners and backing the vehicle into certain spaces may have been previosuly ascertained and by arranging the stud 39 in line with the desired segmental slot, the stud may be brought against the end of the slot and be maintained in such position by means of the brake-band 23, which, when tightened around the drum, will hold the trailer in position and prevent movement of the stud away from the end of the segmental slot.

It is to be noted that I have provided a swinging support 52 to hold the front end of the semi-trailer elevated when disconnected from the tractor, and when the trailer is so elevated the tractor may be moved backward underneath the front end of the trailer body, during which movement the tractor coupling member may be entered into the trailer coupling member, and when the rear end of said tractor coupling member strikes the inner end of the channel in said tractor coupling member, the openings in both members will be in alinement to receive the horizontal coupling pin 29, by means of which the two coupling members are connected.

It is to be noted that due to the platform 14 being tilted rearwardly and the front end of the trailer coupling member being rounded, the latter serves as a skid to facilitate its riding onto said platform, which is greatly aided by the anti-friction rollers 26, and when in proper position with reference to the coupling member on the platform, will have positioned said platform into horizontal position. After the trailer is coupled to the tractor the support 52 may be swung from the position shown in Fig. 2 to that shown in Fig. 1. For this purpose, the support has a segmental arm 53 pivotally secured thereto which passes upwardly through a loop secured to the side of the trailer body, a set screw being threaded through the loop to impinge against said segmental arm and retain the support in either of its two positions.

Having thus described my invention, what I claim is,—

1. The combination of a tractor and a trailer pivotally connected together, an element rotatable to conform to the angular movements of said trailer with respect to said tractor and having a series of segmental slots of different lengths, and an arresting element movable toward and from the pivot permitting such angular movements so as to enter any of the slots of said series.

2. The combination of a tractor having a platform normally inclined rearwardly, a coupling member on said platform, a trailer having a skid-like member adapted to be engaged by the upper face of said platform when said platform is moved backwardly underneath the front end of said trailer, said skid-like coupling member being adapted to swing said platform into horizontal position when said platform is moved underneath said trailer, and means for connecting said coupling member.

3. The combination of two vehicles, an upwardly extending coupling member on one of said vehicles and a downwardly extending longitudinally channeled coupling member on the other vehicle having an end opening and in the channel of which said first-mentioned member is entered, and means for connecting said coupling members together.

4. The combination of two vehicles, an upstanding coupling member on one of said vehicles having a tapered rear portion, a channeled coupling member depending from the other vehicle and having the channel thereof conforming in shape to that of the first-mentioned coupling member, said first-mentioned coupling member being entered in said channel, and a horizontal element for coupling said members together.

5. The combination of a tractor having a platform and an upstanding coupling member rising from said platform, a trailer having a channeled coupling member in which said first-mentioned coupling member is entered, said second-mentioned coupling member having its under side rounded upwardly at its front end, and means for connecting said coupling members together.

6. The combination of a tractor having a platform at its rear end provided with an upstanding coupling member having a tapered rear portion, a trailer having a depending coupling member at its front end, the under side of which is adapted to bear against the upper face of said platform, and being rounded at its front end, said second-mentioned coupling member being channeled and having the channel corresponding in shape to said first-mentioned coupling member to receive the same, and means for connecting said coupling members.

7. The combination of a tractor having a pivotally-supported platform at its rear end, said platform being provided with an elongated coupling member having a parallel sided front portion and a tapered rear portion terminating in a rounded rear end, a trailer having a coupling member channeled to correspond to the shape of said first-mentioned coupling member, the under side of said second-mentioned coupling member being adapted to bear against the upper face of said platform and being rounded at its front end, and means for connecting said coupling members together.

8. The combination of a tractor having a platform normally inclined rearwardly, a coupling member on said platform, a semi-trailer having traction wheels at its rear end, movable supports at its front end to hold the same elevated and a skid-like coupling member adapted to be engaged by the upper face of said platform when said platform is moved backwardly underneath the front end of said trailer, said skid-like coupling member being adapted to swing said platform into horizontal position when said platform is moved underneath said trailer, and means for connecting said coupling members.

9. The combination of a tractor having a rotatable coupling member, a brake-drum secured to said coupling member, a brake-band surrounding said brake-drum, means for actuating said brake-band, a trailer, a skid-like coupling member depending from the front end of said trailer and rigidly connected thereto, and means for connecting said skid-like coupling member to said rotatable coupling member.

10. The combination of a tractor and a trailer pivotally connected together horizontally, an element rotatable to conform to the angular movement of said trailer with respect to the tractor and having a series of segmental slots of different lengths, and an arresting element adjustable to enter any of the slots of said series but being immovable in the direction of the trend of said slots.

11. The combination of a tractor having a rotatable coupling member, a trailer having a rigid coupling member to which said rotatable member is connected, a disk rotatable with said rotatable coupling member and having a radial slot opening at the periphery of said disk and a plurality of segmental slots of different lengths opening into said radial slot, a rigid member carried by the tractor having a slot in alinement with said radial slot, a stud movable into and out of said radial slot and slidable in the slot of said rigid member, and means for positioning said stud in line with any of said segmental slots so that upon rotation of said disk said stud may enter the registering slot and engage the end thereof to limit the angular movement of said trailer.

12. The combination of two vehicles, a rotatable coupling member on one vehicle, a coupling member on the other vehicle connected to said rotatable member, and selective mechanism for limiting the angular movement of one of said vehicles with reference to the other, said selective mechanism having a portion rotatable with said rotatable coupling member and a portion movable axially with reference thereto.

13. The combination of two vehicles, a rotatable coupling member on one of said vehicles having its axis vertical or substantially so, a coupling member on the other vehicle coupled to said rotatable coupling member, a disk rotatable with said rotatable coupling member and having a radial slot and two series of segmental slots opening into said radial slots from opposite sides, the slots of each series being segmentally shaped and of different lengths, a rigid member on said first-mentioned vehicle having a slot alined with said radial slot, a stud slidable in said rigid member and movable into said radial slot into alinement with any one of either series of segmental slots, and means for adjusting said stud.

14. The combination of a tractor having a platform, a rotatable coupling member journaled in said platform and projecting upwardly therefrom, a trailer having a skid-like coupling member channeled to receive said rotatable coupling member, the front end of said skid-like coupling member being curved upwardly and having its bearing face provided with anti-friction elements.

15. The combination of a tractor having a pivotally-mounted platform normally inclined rearwardly, a coupling member rotatable in said platform and having an elongated coupling portion extending above said platform, a trailer having a coupling member rigidly secured to its front end and adapted to be coupled to said rotatable coupling member, said rigidly secured coupling member having its under side adapted to bear against the upper side of said platform and said under side being rounded at its front end and provided with anti-friction means adapted to come in contact with said platform when coupling the trailer to said tractor.

16. The combination of a tractor having a pivotally-supported platform at its rear end, a trailer, a vertically-disposed pivot element connecting said trailer to the platform of said tractor, selective means for limiting the angular movement of said trailer with reference to said tractor, a rock shaft mounted on said platform and operatively connected with said selective means, a rock shaft secured to the front portion of said tractor, a universal joint connecting said rock shafts, and an operating element secured to said second-mentioned rock shaft.

In testimony whereof I affix my signature.

ANDREW J. BORST, Jr.

DISCLAIMER 1,374,352.—*Andrew J. Borst, jr.*, Buffalo, N. Y. VEHICLE. Patent dated April 12, 1921. Disclaimer filed May 8, 1931, by the assignee, *Fruehauf Trailer Company*.

Hereby disclaims:

All tractor-trailer combinations, as claimed in claim 2, except one in which one engaging member has a projecting part which, as the tractor backs into the trailer, enters between spaced portions of the engaging surfaces on the other engaging member to guide and allow fore and aft movement of the engaging members to and from final coupling relation by relative fore and aft tractor-trailer movement only, and in which the engaging members cooperate in an automatic elevation of the front end of the trailer as the tractor backs into it in coupling, and an automatic lowering of the front end of the trailer as the tractor pulls away from it in uncoupling.

[*Official Gazette May 26, 1931.*]

DISCLAIMER 1,374,352.—*Andrew J. Borst, jr.*, Buffalo, N. Y. VEHICLE. Patent dated April 12, 1921. Disclaimer filed February 17, 1934, by the assignee, *Fruehauf Trailer Company*.

Hereby disclaims claims 2 and 8.

[*Official Gazette March 13, 1934.*]